United States Patent [19]
Danz

[11] Patent Number: 5,188,473
[45] Date of Patent: Feb. 23, 1993

[54] BAR ANCHOR ARRANGEMENT

[76] Inventor: Robert Danz, Cheruskerstr. 13, 7036 Schöaich, Fed. Rep. of Germany

[21] Appl. No.: 778,072
[22] PCT Filed: Jun. 25, 1990
[86] PCT No.: PCT/EP90/01132
§ 371 Date: Dec. 4, 1991
§ 102(e) Date: Dec. 4, 1991
[87] PCT Pub. No.: WO91/00433
PCT Pub. Date: Jan. 10, 1991

[30] Foreign Application Priority Data
Jul. 5, 1989 [DE] Fed. Rep. of Germany ....... 3922070

[51] Int. Cl.⁵ .................................................. B25G 3/00
[52] U.S. Cl. ........................................ 403/27; 403/43; 403/44
[58] Field of Search ............... 403/44, 43, 45, 46, 403/47, 48, 27

[56] References Cited
U.S. PATENT DOCUMENTS
1,226,830 5/1917 Walker ................................. 403/44
1,683,516 9/1928 Adams ............................. 403/44 X FOREIGN PATENT DOCUMENTS
127035 5/1919 United Kingdom ................. 403/48

Primary Examiner—Andrew V. Kundrat
Attorney, Agent, or Firm—Sughrue, Mion, Zinn, Macpeak & Seas

[57] ABSTRACT

The invention relates to a bar anchor arrangement for bars subject to tensile stress, whereby the bar anchor (1) consists of an anchor body with a bore provided with an internal thread (5) for screwing in a tension bar (8) provided with an external thread (9) as well as of two parallel eye plates (3) adjoining the anchor body to accomodate an eye bar (10). A smooth tolerance compensating section (6 and 7) is provided on at least one side of the internal thread (5). The length of the external thread (9) of the tension bar (8) essentially corresponds to the minimum screw-in length of the tension bar plus the length of a tolerance compensating section. The length of the internal thread (5) is greater than the minimum screw-in length of the tension bar.

9 Claims, 1 Drawing Sheet

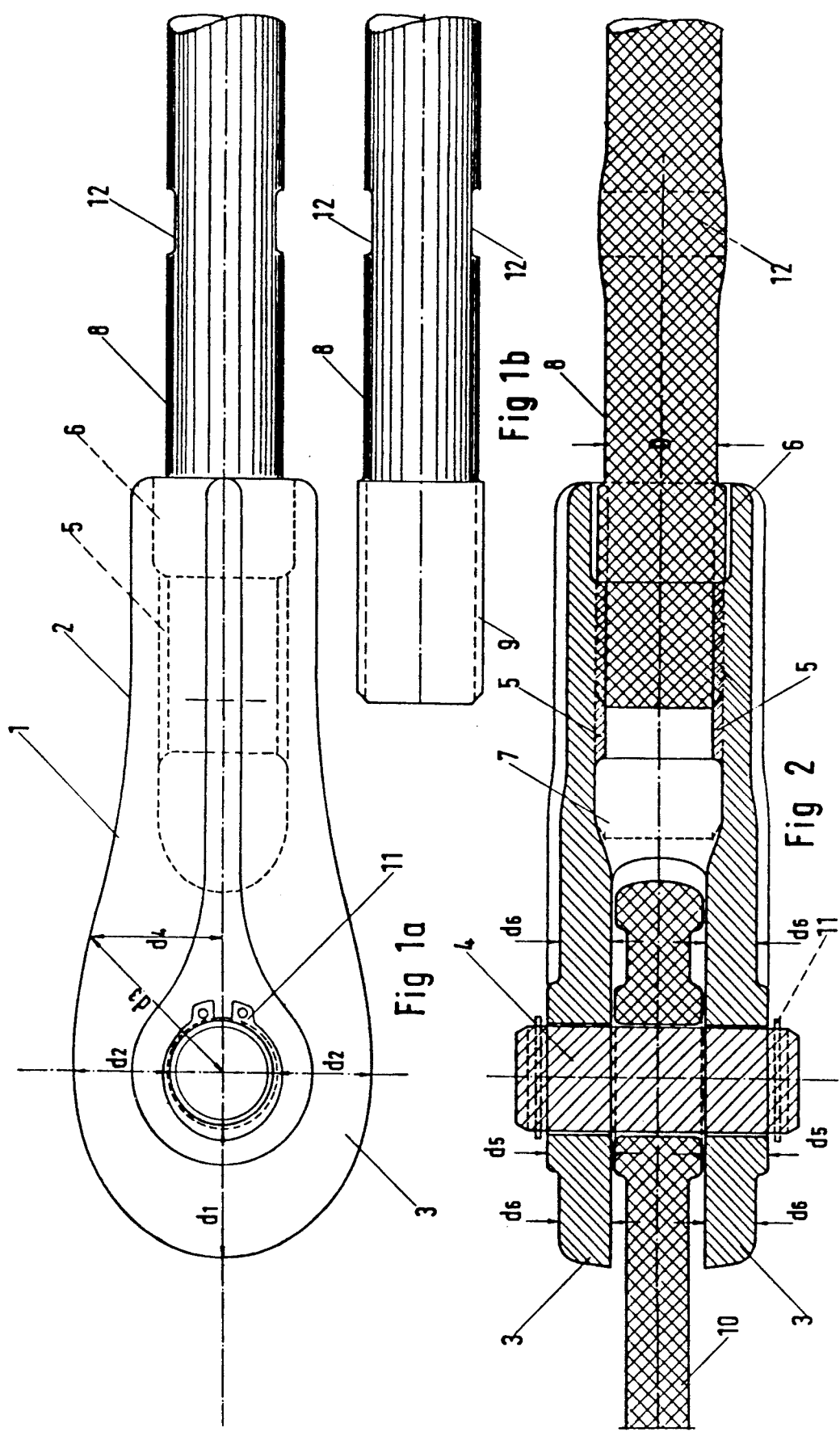

BAR ANCHOR ARRANGEMENT

The invention relates to a bar anchor arrangement for bars and eye bars which are subject to tensile stress, whereby the bar anchor consists of a bar anchor body with a bore with internal thread for screwing in a tension bar provided with an external thread as well as of two parallel eye plates adjoining the anchor body to accommodate an eye bar.

Such bar anchor arrangements have been known for a long time.

The problem of these arrangements is that it must always be ensured that the tension bar is screwed into the internal thread of the bar anchor up to the minimum screw-in length under all circumstances.

It was attempted to solve this with a design where a check bore was provided in the bar anchor body perpendicular to the longitudinal axis through which it was possible to establish the required minimum screw-in length of the tension bar into the internal thread of the anchor. This arrangement is shown by DE-U 87 07 293.

Although this solution from the applicant and inventor has already been used successfully in building construction (Bieberach Technical University), it did not appear fully satisfactory. The check bore always results in an undesirable weakening of the cross-section, even if the edge zones of the check bore are reinforced by a bead.

In addition, such a check bore on a bead-type reinforcement does not look attractive. In addition, no tolerance ranges could be established with this check bore.

The task of the invention was to create a bar anchor arrangement of the type mentioned above where it is guaranteed in all cases that the required minimum screw-in length can be observed. In addition, it should also be able to establish the minimum screw-in length with a positive or negative tolerance in all cases.

The invention will now be explained in further detail on the basis of a realized example in conjunction with the enclosed drawing.

The drawing shows the following:

FIG. 1a A schematic top view of the bar anchor with tension bar in accordance with the invention;

FIG. 1b A schematic top view of a section of the tension bar and

FIG. 2 A cross-sectional view of the bar anchor arrangement in accordance with the invention.

FIG. 1a shows a bar anchor 1 with an anchor body 2, which possesses two adjoining eye plates 3 into which the eye bolt 4 shown in FIG. 2 can be inserted. The bar anchor 2 possesses a bore in which an internal thread 5 is provided. The dimensions of this internal thread will be described below.

A smooth bore tolerance compensating section 6 is provided at the outer end of the bore. A further tolerance compensating section 7 is preferably also provided on the other side of the internal thread, as shown in FIG. 2.

A tension bar 8 can be screwed into the internal thread 5 of the bore in the bar anchor 2 by means of an external thread 9. In this context, it must be mentioned that these tension bars possess a turnbuckle character, i.e. that a right-hand thread is provided at one end and a left-hand thread at the other, not-shown, end. Equally, there are then bar anchors with right-hand and left-hand internal threads. As shown in FIG. 2, an eye bar 10 can be inserted between the two eye plates 3 which is then held by the eye bolt 4. This in turn is prevented from slipping out by a Seeger circlip ring 11.

The dimensions of the individual threads are of particular importance.

Finally, FIGS. 1a and 1b also show a recess 12, which is preferably made onto opposing sides of the tension bar, thus facilitating screwing-in of the tension bar into the bar anchor.

The dimensions of the individual threads and tolerance compensating sections are chosen so that the minimum screw-in length of the external thread 9 into the internal thread 5 of the bar anchor 2 is reached at least when the tension bar is screwed in so far that the thread can no longer be seen. In other words, the length of the external thread 9 of the tension bar 8 and also the length of the internal thread 5 of the bar anchor 2 essentially correspond to the minimum screw-in length plus the length of a tolerance compensating section 6.

Taking into account these thread lengths, it is thus possible to achieve a certain amount of tolerance compensation without failing to reach the minimum screw-in length. In addition, it is also more aesthetic if no open thread can be seen.

The other dimensions of the new bar anchor arrangement are also of great importance. If the cross-section of the tension bar 8 with its diameter D is taken as the standard dimension, then the eye plates possess the following dimensions: The material thickness d1 of the eye plates in the direction of tensile stress corresponds approximately to the diameter D of the tension bar. The material thickness d2 of the eye plates in a direction perpendicular to this passing through the center point of the eye bolt corresponds approximately to 0.74 times the diameter of the tension bar. The width d3 at the transition from the eye plates 3 to the anchor body, measured at an angle of 45° with respect to the longitudinal axis, corresponds approximately to 1.04 times the diameter of the tension bar. The same dimensions can also be found as dimension d4 perpendicular to the longitudinal axis from the end point of dimension d3.

The cross-section dimensions of the eye plates 3 in the area of the eye bolt 4 are d5 and thus correspond to approximately 0.5 times the diameter D of the tension bar. These dimensions are reduced to d6 on both sides of the eye bolt, this corresponding to approximately 0.4 times the diameter of the tension bar in each case.

The eye of the eye bar 10, which is a flat bar, possesses the same radial dimensions d1, d2, d3 and d4 as the eye plates of the bar anchor.

This bar anchor arrangement in accordance with the invention must be seen as an overall arrangement and should be used only with the specified dimensional relationships, since these dimensions represent the optimum possible with respect to form, material utilization, simple assembly and simple dismantling, something which has been confirmed by calculations and tests. Deviations should therefore not be made under any circumstances.

This new bar anchor arrangement can thus be installed and removed easily and permits the required minimum screw-in length to be monitored easily and effectively by the fact that no thread turns can be seen.

Rolling of the external thread 9 onto the tension bar is preferred, because this contributes considerably to the stability of the thread and the strength of the overall bar anchor arrangement. The task to be solved by the invention is thus clearly solved.

What is claimed is:

1. In a bar anchor arrangement for bars subjected to tensile stress, consisting of a bar anchor having an anchor body with a bore including an internal thread and two spaced parallel eye plates oriented parallel to the longitudinal axis of the adjoining anchor body and integral with said anchor body and accommodating an eye bar, and a tension bar provided with an external thread screwed into the internal thread of the bore, the improvement wherein the bore of the anchor body comprises a first smooth, unthreaded tolerance compensating section, said internal thread adjoining said first tolerance compensating section, and a second smooth, unthreaded tolerance compensating section adjoining said internal thread, wherein both tolerance compensating sections have a slightly larger diameter than the diameter of the external thread of the tension bar, and wherein the length of the external thread of the tension bar corresponds substantially to the minimum screw-in length of the tension bar plus the length of one of the tolerance compensating sections.

2. Bar anchor arrangement in accordance with claim 1, wherein the length of the internal thread is greater than the minimum screw-in length of the tension bar.

3. Bar anchor arrangement in accordance with claim 1, wherein the diameter of an opening between the parallel eye plates (3) is approximately 0.85 times as large as a diameter (D) of the tension bar.

4. Bar anchor arrangement in accordance with claim 1, wherein a radial dimension (d1) of the eye plates in the direction of tensile stress corresponds approximately to a diameter (D) of the tension bar, a radial dimension (d2) in a direction perpendicular to the longitudinal axis and passing through the center point of the openings corresponds approximately to 0.74 times the diameter (D) of the tension bar and a dimension (d3) at the transition of the eye plates to the anchor body, measured at an angle of 45° with respect to a longitudinal axis of the bar anchor and a dimension (d40) measured perpendicularly to the anchor body longitudinal axis both respectively correspond approximately to 1.04 times the diameter (D) of the tension bar.

5. Bar anchor arrangement in accordance with claim 1, wherein a material thickness (d5) of the eye plates in the area of the openings provided for an eye bolt corresponds approximately to 0.5 times the diameter of the tension bar and is reduced in the longitudinal direction on both sides of said area to approximately 0.4 times the diameter of the tension bar (d6).

6. Bar anchor arrangement in accordance with claim 1, wherein an eye bar is held to the eye plate by means of an eye bolt passing through alignment holes of the eye plate and wherein the eye of the eye bar at an inner end thereof has dimensions (d1, d2, d3, d4) corresponding to same dimensions of the eye plates of the bar anchor.

7. Bar anchor arrangement in accordance with claim 1, wherein the external thread of the tension bar is rolled.

8. Bar anchor arrangement in accordance with claim 1, wherein the tension bar has at least one flat embossed section on a side thereof.

9. Bar anchor arrangement in accordance with claim 8, wherein said at least one flat embossed section on said tension bar comprises diametrically opposed embossed sections on opposite sides of said tension bar.

* * * * *